3,304,322
ALKALI METAL SALTS OF PERCHLOROFLUORO-
ACETONE CYANOHYDRINS
Theodore Mill, Palo Alto, and John O. Rodin and Robert M. Silverstein, Menlo Park, Calif., and Cyril Woolf, Morristown, N.J., assignors to Allied Chemical Corporation, New York, N.Y., a corporation of New York
No Drawing. Filed Mar. 24, 1964, Ser. No. 354,436
12 Claims. (Cl. 260—465.6)

This invention relates to novel alkali metal salts of perhalofluoroacetone cyanohydrins. More particularly, the invention relates to the sodium and potassium salts of perhalofluoroacetone cyanohydrins and to a process for their preparation.

Perhalofluoroacetone cyanohydrins have been suggested for the preparation of the amides of glycolic acid as well as a host of other important chemical compounds. Conventionally, the preparation of perhalofluoroacetone cyanohydrins, for example, hexafluoroacetone cyanohydrin involves reacting a ketone compound such as hexafluoroacetone with hydrogen cyanide in dry ether. However, hydrogen cyanide is a toxic gas and the preparation by this procedure is hazardous and uneconomical. The present invention employs a new procedure which is safer, more economical and does not require hydrogen cyanide gas.

An object of the invention is to provide an improved process for converting alkali metal salts of the perhalofluoroacetone cyanohydrins to corresponding acids and amides. Another object of the invention is to provide novel alkali metal salts of perhalofluoroacetone cyanohydrins and a process for their preparation. Other objects and advantages will be apparent from the following detailed description.

The alkali metal salts of perhalofluoroacetone cyanohydrins of the invention are of the general formula

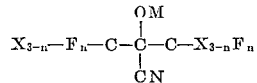

wherein M is an alkali metal; X is a halogen having an atomic number not exceeding 35; $n$ is an integer from 0 to 3 inclusive and at least one fluorine atom is present in the molecule. Examples of such compounds include:

1,3-dichlorotetrafluroacetone cyanohydrin sodium salt
1,3-dichlorotetrafluoroacetone cyanohydrin potassium salt
1,1,3-trichlorotrifluoroacetone cyanohydrin sodium salt
1,1,3-trichlorotrifluoroacetone cyanohydrin potassium salt
1,1,3,3,-tetrachlorodifluoroacetone cyanohydrin sodium salt
1,1,3,3-tetrachlorodifluoroacetone cyanohydrin potassium salt
1-chloropentafluoroacetone cyanohydrin sodium salt
1-chloropentafluoroacetone cyanohydrin potassium salt
Hexafluoroacetone cyanohydrin sodium salt
Hexafluoroacetone cyanohydrin potassium salt
1,3-dibromotetrafluoroacetone cyanohydrin sodium salt
1,3-dibromotetrafluoroacetone cyanohydrin potassium salt
1,1,1-trichlorotrifluoroacetone cyanohydrin potassium salt
1,1,1,3-tetrafluorodichloroacetone cyanohydrin sodium salt The novel alkali metal salts of perhalofluoroacetone cyanohydrins of the present invention may be prepared by the process which comprises reacting under anhydrous conditions in the presence of tetrahydrofuran, an alkali metal cyanide with a perhalofluoroacetone of the formula

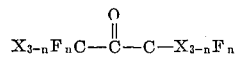

wherein X is a halogen having an atomic number not exceeding 35; $n$ is an integer from 0 to 3 and at least one fluorine is present in the molecule.

We made the unexpected discovery that alkali metal cyanides will react with perhalofluoroacetones to form the alkali metal salts of the perhalofluoroacetone cyanohydrins if the reaction is conducted in anhydrous medium in the presence of tetrahydrofuran which acts as a reaction promoter. It is essential for optimum results that the reaction take place under substantially anhydrous conditions and for this reason, substantially anhydrous reactants are employed for the reaction.

The reaction which takes place may be represented by the following equation:

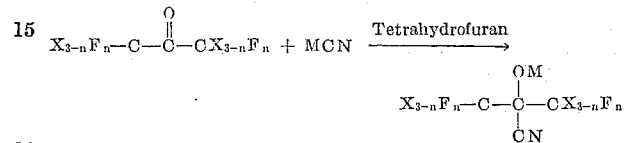

wherein M is an alkali metal; X is a halogen having an atomic number not exceeding 35; $n$ is an integer from 0 to 3 inclusive and at least one fluorine atom is present in the molecule.

The choice of perhalofluoroacetone reactants which may be employed in the reaction depends upon the desired ultimate product to be produced. Illustrative of the perhalofluoroacetone reactants which may be employed to produce the novel compounds of the invention are:

1,3-dichlorotetrafluoroacetone,
1-chloropentafluoroacetone,
1,1,3-trichlorotrifluoroacetone,
Hexafluoroacetone,
1,1,3,3-tetrachlorodifluoroacetone,
1,3-dibromotetrafluoroacetone,
1,1,1-trichlorotrifluoroacetone,
1,1,1,3-tetrafluorodichloroacetone.

These perhalofluoroacetone reactants are easily obtainable compounds and may be prepared by a wide variety of procedures known in the art.

The reaction is conducted in the presence of tetrahydrofuran which functions as a reaction promoter. If desired, a diluent may be employed for the tetrahydrofuran. Diluents suitable for the tetrahydrofuran are substantially nonreactive under the conditions of the reaction with the reactants and reaction products. Some suitable diluents for the tetrahydrofuran which may be employed in the practice of the invention are for example; diethylether, petroleumether, benzene, trichlorotrifluoroethanes, dioxane and glycol diethylether. From the standpoint of rapidity of reaction, however, it is preferred to employ undiluted tetrahydrofuran. The tetrahydrofuran may be employed in a weight ratio of tetrahydrofuran to perhalofluoroacetone of between 2 to 1 and 20 to 1 inclusive. The preferred ratio of tetrahydrofuran to perhalofluoroacetone lies between 3 to 1 and 7 to 1 inclusive. Where solutions of inert diluent are used, the concentration of tetrahydrofuran may be between 5% and 80%.

The mole ratio of alkali metal cyanide to perhalofluoroacetone utilized in preparing the compounds of the invention may be varied from about 0.5 to 1.0 to about 2.0 to 1.0 respectively. Preferably, a range of about 1.0 to 1.0 to about 1.2 to 1.0 respectively is used.

The reaction proceeds over the range of from about —20° to about 80° C., the upper temperature limit being dictated by the boiling point of the reaction system. Preferably, a range of about —10° C. to about 40° C. is employed.

The reaction may be conveniently carried out at atmospheric pressure, however, the use of sub-atmospheric or super-atmospheric pressure may be employed if desired.

The reaction is desirably conducted in a vessel equipped with cooling means and agitating means. In addition, the vessel may be equipped with gas inlet means for introduction of an inert gas such as nitrogen which removes trace amounts of moisture from the reaction zone. The order of addition and manipulation during charging of the reactants to the reaction vessel is not critical. It is usually convenient to add the perhalofluoroacetone slowly to a cooled stirred suspension of alkali metal cyanide in tetrahydrofuran. Conversely, alkali metal cyanide in finely divided form may be added gradually to a mixture of perhalofluoroacetone and tetrahydrofuran, suitably cooled. Obvious variations of the procedure, such as continuous addition of both reactants to tetrahydrofuran, and simultaneous withdrawal of product in tetrahydrofuran solution will be apparent.

The reaction is usually complete after a few hours. Merely as illustrative when it is desired to produce the sodium salt of the perhalofluoroacetone cyanohydrin, according to the process of the invention, the reaction is usually complete in about one hour.

The crude product is generally separated from the reaction medium by evaporating the solution containing the product. For increased purity, however, the product is treated with a solvent such as ether in which the product, but not the impurities, is substantially insoluble.

The following examples illustrate the invention, but are not to be construed as limiting thereof.

EXAMPLE 1

*Preparation of 1,3-dichlorotetrafluoroacetone cyanohydrin sodium salt*

Into a 250 ml. three necked flask, fitted with a stirrer and a dropping funnel were added 100 ml. of tetrahydrofuran and 4.9 g. (0.10 mole) of sodium cyanide. Twenty grams (0.10 mole) 1,3-dichlorotetrafluoroacetone was added dropwise to the stirred suspension which was maintained at about 5° C. The sodium cyanide dissolved within an hour giving an orange solution. The solution was evaporated at the water pump, and this was followed by trituration with ether. About 19.5 grams of a white powder was recovered which was identified as 1,3-dichlorotetrafluoroacetone cyanohydrin sodium salt. The yield was about 79%. The product was identified by ultimate analysis, I.R. and hydrolysis.

*Analysis.*—Calc'd for $C_4F_4Cl_2ONN_a$ 248: N, 5.65; Na, 9.32. Found: N, 6.03, 5.76; Na, 9.49.

EXAMPLE 2

The procedure of Example 1 was followed employing sodium cyanide and perfluoroacetone as reactants and there was produced a product identified as perfluoroacetone cyanohydrin sodium salt for about an 87% yield.

EXAMPLE 3

The procedure of Example 1 was followed employing sodium cyanide and 1,1,3-trichlorotrifluoroacetone as reactants and there was produced a product identified as 1,1,3-trichlorotrifluoroacetone cyanohydrin sodium salt for about a 49% yield.

EXAMPLE 4

The procedure of Example 1 was followed employing sodium cyanide and 1,1,3,3-tetrachlorodifluoroacetone as reactants and there was produced a product identified as 1,1,3,3-tetrachlorodifluoroacetone cyanohydrin sodium salt for about a 32% yield.

EXAMPLE 5

Using the equipment described in Example 1, a suspension of potassium cyanide in ether containing 5 volume percent of tetrahydrofuran reacted rapidly between 5° C. and room temperature with 1,1,3-trichlorotrifluoroacetone to produce a product identified as 1,1,3-trichlorotrifluoroacetone cyanohydrin potassium salt.

EXAMPLE 6

The procedure of Example 5 was followed employing potassium cyanide and 1,1,3,3-tetrachlorodifluoroacetone as reactants and there was produced a product identified as 1,1,3,3-tetrachlorodifluoroacetone cyanohydrin potassium salt.

The alkali metal salts of the present invention may be converted to the corresponding cyanohydrins which in turn may be converted to the corresponding amides and acids. Merely as illustrative, when 1,3-dichlorotetrafluoroacetone cyanohydrin sodium salt prepared according to Example 1 is moderately heated with concentrated sulfuric acid, the amide of bis(chlorodifluoromethyl)glycolic acid forms while under more vigorous conditions, i.e., increasing the temperature to within the range of about 75 to 125° C. and using 80 to 95% weight by weight percentage $H_2SO_4$ containing some water, free bis(chlorodifluoromethyl)glycolic acid is formed. The reaction may be illustrated by the following equations.

(1) 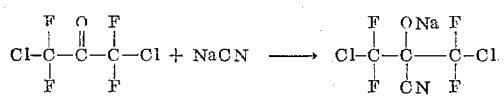

(2) 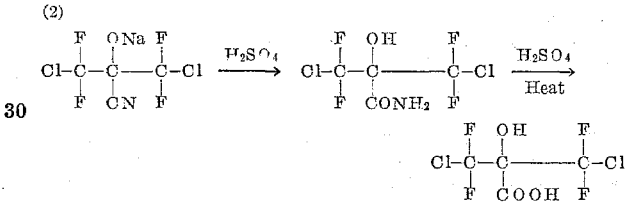

Thus, the alkali metal salts of the perhalofluoroacetone cyanohydrins are useful for the preparation of ketone cyanohydrins which are valuable chemical intermediates for the preparation of a wide host of important products containing the nitrile group which in turn may be converted to acids, amines and a host of other important chemical compounds.

Although certain preferred embodiments of the invention have been disclosed for purposes of illustration, it will be evident that various changes and modifications may be made therein without departing from the scope and spirit of the invention.

We claim:

1. Alkali metal salts of perhalofluoroacetone cyanohydrin of the formula

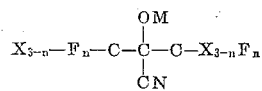

wherein M is an alkali metal; X is a halogen having an atomic number not exceeding 35; $n$ is an integer from 0 to 3 inclusive and at least one fluorine atom is present in the molecule.

2. 1,3-dichlorotetrafluoroacetone cyanohydrin sodium salt.

3. 1,1,3-trichlorotrifluoroacetone cyanohydrin sodium salt.

4. 1,1,3,3-tetrachlorodifluoroacetone cyanohydrin sodium salt.

5. 1,1,3 - trichlorotrifluoroacetone cyanohydrin potassium salt.

6. A process for producing an alkali metal salt of perhalofluoroacetone cyanohydrin of the formula

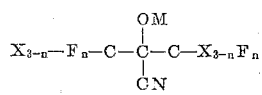

wherein M is an alkali metal; X is a halogen having an atomic number not exceeding 35; $n$ is an integer from 0 to 3 inclusive and at least one fluorine atom is present in the molecule, which comprises reacting under anhydrous conditions in the presence of tetrahydrofuran an alkali metal cyanide with a corresponding perhalofluoroacetone of the formula

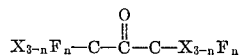

wherein X is a halogen having an atomic number not exceeding 35; n is an integer from 0 to 3 and at least one fluorine is present in the molecule, said tetrahydrofuran being present in a quantity at least sufficient to promote the reaction between said alkali metal cyanide and perhalofluoroacetone.

7. A process for producing an alkali metal salt of perhalofluoroacetone cyanohydrin of the formula

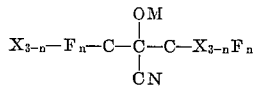

wherein M is an alkali metal; X is a halogen having an atomic number not exceeding 35; n is an integer from 0 to 3 inclusive and at least one fluorine atom is present in the molecule, which comprises reacting under anhydrous conditions in the presence of tetrahydrofuran at a temperature within the range of about −20 to +80° C., an alkali metal cyanide with a corresponding perhalofluoroacetone of the formula

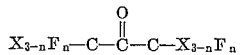

wherein X is a halogen having an atomic number not exceeding 35; n is an integer from 0 to 3 and at least one fluorine is present in the molecule, the weight ratio of tetrahydrofuran to perhalofluoroacetone being between 2:1 and 20:1.

8. The process of claim 6 wherein the alkali metal cyanide is sodium cyanide and the perhalofluoroacetone is 1,3-dichlorotetrafluoroacetone.

9. The process of claim 6 wherein the alkali metal cyanide is sodium cyanide and the perhalofluoroacetone is 1,1,3-trichlorotrifluoroacetone.

10. The process of claim 6 wherein the alkali metal cyanide is sodium cyanide and the perhalofluoroacetone is 1,1,3,3-tetrachlorodifluoroacetone.

11. The process of claim 6 wherein the alkali metal cyanide is potassium cyanide and the perhalofluoroacetone is 1,1,3-trichlorotrifluoroacetone.

12. The process of claim 6 wherein the alkali metal cyanide is potassium cyanide and the perhalofluoroacetone is 1,1,3,3-tetrachlorodifluoroacetone.

References Cited by the Examiner

Darrall et al., J. Chem. Soc., 1951, pages 2329–2332.
Degering, "An Outline of Organic Nitrogen Compounds," 1945, page 508.
Lovelace et al., "Aliphatic Fluorine Compounds," 1958, pages 266, 276.

CHARLES B. PARKER, *Primary Examiner.*

JOSEPH P. BRUST, *Examiner.*